(No Model.)　　　J. L. A. AYMARD.　　2 Sheets—Sheet 1.
STERILIZING APPARATUS.

No. 566,886.　　　　　Patented Sept. 1, 1896.

Witnesses:
R. W. Pittman
Fred. J. Dole

Inventor:
John L. A. Aymard,
By his Attorney
F. H. Richards, (No Model.) 2 Sheets—Sheet 2.

J. L. A. AYMARD.
STERILIZING APPARATUS.

No. 566,886. Patented Sept. 1, 1896.

Witnesses:
R. W. Pittman
Fred. J. Dole.

Inventor:
John L. A. Aymard
By his Attorney
F. A. Richards.

United States Patent Office.

JOHN LAW AYMÉ AYMARD, OF IPSWICH, ENGLAND.

STERILIZING APPARATUS.

SPECIFICATION forming part of Letters Patent No. 566,886, dated September 1, 1896.

Application filed March 31, 1896. Serial No. 585,559. (No model.)

*To all whom it may concern:*

Be it known that I, JOHN LAW AYMÉ AYMARD, a subject of the Queen of Great Britain, residing at St. Matthews, Ipswich, in the county of Suffolk, England, have invented certain new and useful Improvements in Sterilizing Apparatus, of which the following is a specification, reference being had to the accompanying drawings.

This invention relates to sterilizing apparatus, and has for its object to devise a convenient and inexpensive contrivance that is especially adapted for domestic use for sterilizing milk.

An important feature in my construction of apparatus is that the vessel in which the milk is contained is surrounded by a steam-space save at that part where it dips into the liquid from which the steam is generated. In other words, the milk vessel is steam-jacketed.

In order that my invention may be clearly understood, I will proceed to describe the same fully with reference to the accompanying drawings, in which—

Figure 1:
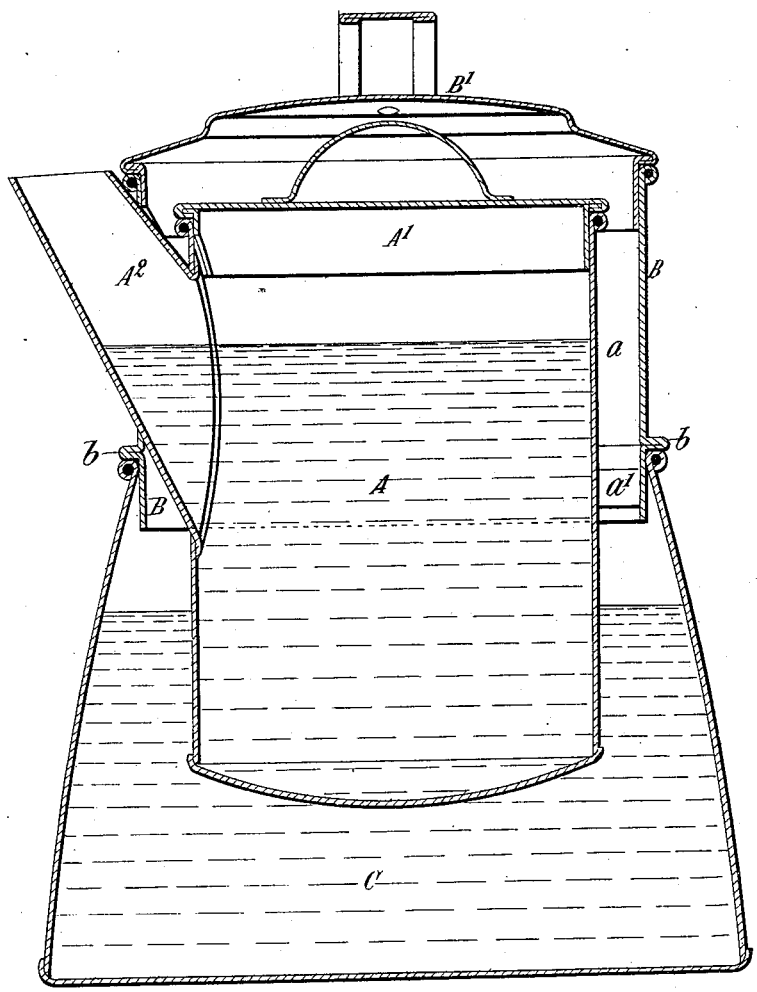
Figure 2:
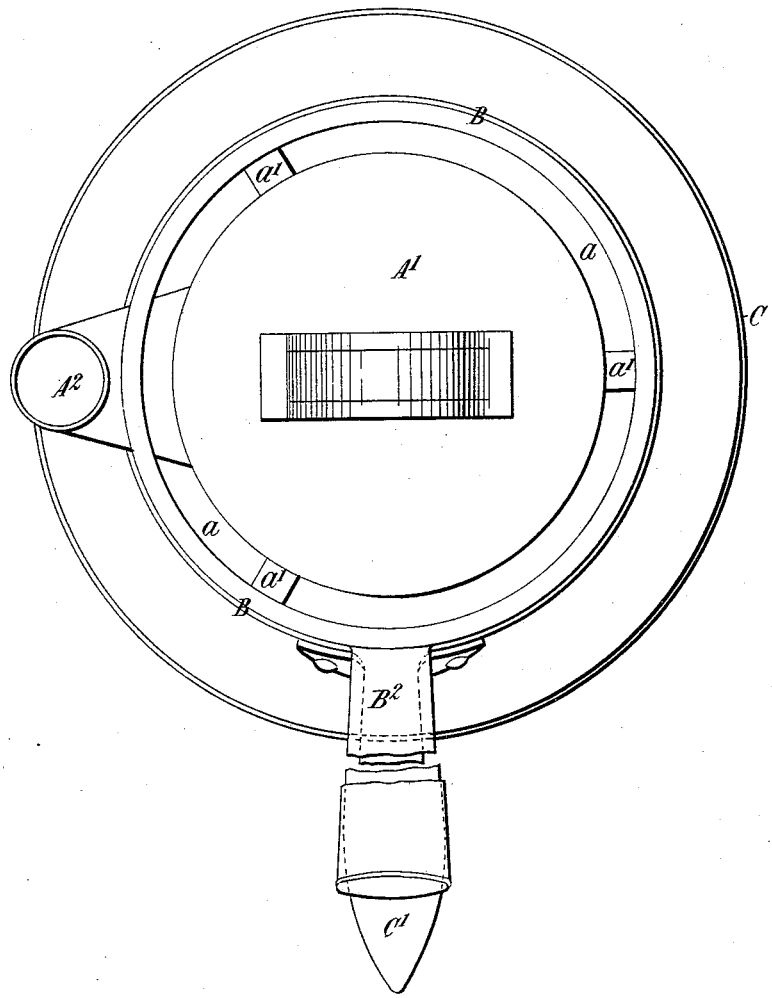

Figure 1 is a central vertical section of the apparatus, and Fig. 2 a plan with the outer lid removed.

A is an inner chamber or vessel into which the milk to be sterilized is placed. This vessel has a tight-fitting lid A' and is surrounded at its upper portion by an outer casing B of larger diameter. The vessel A is connected to the surrounding casing B by distance-pieces $a'$, which extend at intervals across the annular steam-space $a$. The lower portion of the casing B is formed with a flange or shoulder $b$, by which the said casing is supported in the mouth of a saucepan or similar vessel C. The inner vessel A is of such a length that its lower end will dip into water contained in the saucepan. The upper end of the casing B is closed with a lid B' and this lid is preferably of such a diameter that it will also fit the saucepan when the casing B is removed. The inner vessel is provided with a spout $A^2$, which extends through the casing B, a tight joint being formed by solder or other means where the spout passes through the casing.

It will be seen that the distance-pieces $a'$ connect the inner vessel A to the casing B, so that these parts form one piece that can be readily removed from the saucepan by an ordinary handle $B^2$. These parts may, however, be made detachable, if preferred.

C' is a handle on the saucepan C.

If desired, I can form the lip of the lid A' with a deep portion of proper shape to completely cover the opening at the inner end of the spout, so that the contents of the inner vessel can be isolated from the atmosphere. In this case it would be necessary to turn the lid into a position to uncover the spout before the contents of the inner vessel A could be poured out.

What I claim is—

The herein-described device comprising a water vessel; a removable casing supported thereby; a removable cover for said casing; an inner vessel of smaller diameter than said casing and fixedly secured to the same and removable therewith and having a part thereof extending into said water vessel and a part thereof into the said casing, thereby forming a steam-jacket around that part thereof which extends into the casing; and a cover for said casing; said inner vessel having its mouth adjacent to the mouth of the casing, and also having an upwardly-inclined spout extending through the outer wall of the casing.

In testimony whereof I have hereunto set my hand this 7th day of March, 1896.

JOHN LAW AYMÉ AYMARD.

Witnesses:
   GEO. JACOB,
   T. ED. POOLEY.